(12) United States Patent
Schroeter et al.

(10) Patent No.: US 12,379,716 B2
(45) Date of Patent: Aug. 5, 2025

(54) METHODS AND SYSTEMS FOR VERIFICATION OF MACHINE LEARNING-BASED VARNISH ANALYSIS

(71) Applicant: Ford Global Technologies, LLC, Dearborn, MI (US)

(72) Inventors: Robert Schroeter, Livonia, MI (US); Ife Siffre, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 513 days.

(21) Appl. No.: 17/937,664

(22) Filed: Oct. 3, 2022

(65) Prior Publication Data

US 2024/0111276 A1   Apr. 4, 2024

(51) Int. Cl.
    G05B 19/418     (2006.01)
    G06T 7/00       (2017.01)

(52) U.S. Cl.
    CPC ... G05B 19/41875 (2013.01); G05B 19/4187 (2013.01); G06T 7/0004 (2013.01)

(58) Field of Classification Search
    CPC ........... G05B 19/41875; G06T 7/0004; G06T 2207/20081; G06T 2207/20084; G06T 2207/30164; G06T 7/001
    USPC ................................................. 382/100, 173
    See application file for complete search history.

(56) References Cited

U.S. PATENT DOCUMENTS

| 8,275,558 | B2 | 9/2012 | Reed et al. |
| 9,162,513 | B2 | 10/2015 | Pawlik et al. |
| 9,349,087 | B2 | 5/2016 | Cleary |
| 10,059,061 | B2 | 8/2018 | Burns et al. |
| 10,193,695 | B1 | 1/2019 | Endress et al. |
| 2007/0224338 | A1* | 9/2007 | Kimura ................. G01R 31/34 310/43 |
| 2021/0201472 | A1* | 7/2021 | Sohn .................... G06V 10/764 |
| 2022/0082508 | A1* | 3/2022 | Isken .................... G06N 20/00 |

FOREIGN PATENT DOCUMENTS

JP          5181604 B2    4/2013

OTHER PUBLICATIONS

Schroeter, R et al., "Methods and Systems for Predicting Stator Insulation Condition From Stator Sections," U.S. Appl. No. 17/937,649, filed Oct. 3, 2022, 67 pages.
Schroeter, R et al., "Methods and Systems for Varnish Analysis of Stator Images," U.S. Appl. No. 17/937,658, filed Oct. 3, 2022, 71 pages.

* cited by examiner

*Primary Examiner* — Sheela C Chawan
(74) *Attorney, Agent, or Firm* — David Kelley; McCoy Russell LLP

(57) ABSTRACT

Methods and systems are provided for verifying a deep learning tool for evaluating a varnish condition of a stator. In one example, a method for verifying the deep learning tool includes receiving images of replicas of a stator section at a processor of a computing system, the replicas of the stator section having different predetermined varnish fill percentages. The images are process and analyzed by the deep learning tool to output estimated varnish fill percentages. The estimated varnish fill percentages may be compared to the predetermined varnish fill percentages and a notification recommending at least one of further training of the deep learning tool and adjustments to an imaging setup for acquiring the images.

7 Claims, 11 Drawing Sheets

|  | Slot # | Surface Area (mm$^2$) | Varnish Area (mm$^2$) | Percent Fill |
|---|---|---|---|---|
| Twist | 2 | 8.35 | 7.09 | 84.9 |
|  | 18 | 8.35 | 7.55 | 90.4 |
|  | 33 | 8.35 | 8.05 | 96.4 |
| Crown | 2 | 8.35 | 8.15 | 97.6 |
|  | 18 | 8.35 | 7.35 | 88.0 |
|  | 33 | 8.35 | 8.10 | 97.0 |
| Center | 2 | 8.35 | 7.27 | 87.1 |
|  | 18 | 8.35 | 6.94 | 83.2 |
|  | 33 | 8.35 | 7.43 | 89.0 |
| Average |  | 8.35 | 7.55 | 90.4 |
| Min |  | 8.35 | 6.94 | 83.2 |
| Max |  | 8.35 | 8.15 | 97.6 |

FIG. 7

METHODS AND SYSTEMS FOR VERIFICATION OF MACHINE LEARNING-BASED VARNISH ANALYSIS

FIELD

The present description relates generally to methods and systems for evaluating a condition of a stator insulation system.

BACKGROUND/SUMMARY

Electric traction motors, e.g., electric motors or electric machines, may be used to enable vehicle propulsion. In some examples, electric motors may also be operated to regenerate energy, thereby enabling recharging of energy storage devices and reducing fuel consumption in, for example, hybrid electric vehicles. An electromagnetic circuit of an electric traction motor may include a stator which is a stationary component of the circuit configured to interact with a rotor to drive motion of the rotor. For example, the stator core may support conductive windings which generate a rotating magnetic field that causes the rotor to rotate within the stator.

The conductive windings may be coupled to the stator by threading of the windings through slots formed along an inner surface of the stator. To mitigate electrical shorting and degradation of the windings resulting from exposure to moisture and vibrations, and to encapsulate and immobilize end turns of the windings, the stator may be configured with an insulation system that insulates the windings. The insulation system may include a heat tolerant, electrically isolating material applied to the windings as a coating within the slots. The coating may be a varnish formed of a resin such as an epoxy or an alkyd that is applied during manufacturing of the stator.

Various methods for applying the varnish are possible, including dipping the windings in varnish and curing in an oven, trickle varnishing, vacuum pressure impregnation, etc. A condition of the resulting varnish coating the windings within the slots, e.g., a thickness, continuity, and uniformity, may affect a performance and useful life of the stator. Evaluation of the condition of the varnish coating after application may therefore be desirable for manufacturing quality control but efficient assessment of the condition of the varnish coating may be challenging due to a location of the varnish coating within the slots of the stator. Conventional methods for testing winding insulation, such as insulation resistance tests, may confirm that the coating is continuous but does not provide information regarding thickness and uniformity. In order to reliably evaluate the varnish coating condition, destructive techniques may be demanded, such as cutting a sacrificial stator into pieces to visually examine the varnish coating within the stator's inner surfaces. Visual examination can be costly, time consuming, and prone to wide variations in accuracy. A more efficient, robust method for analyzing varnish coating of windings within the stator slots is therefore desirable.

As one example, analysis of the varnish coating may be accomplished using deep learning algorithms of a deep learning tool to process and estimate the condition of the varnish coating based on images of the stator. The deep learning tool may allow the images to be processed and analyzed rapidly, e.g., within seconds, based on training protocols leveraging various image processing and machine learning algorithms. In order to increase and maintain an accuracy of predictions output by the deep learning tool, however, a method for verifying results generated by the deep learning tool is desired.

In one example, the issues described above may be addressed by a method for verifying the accuracy of a deep learning tool, the method including receiving images of replicas of a stator section at a processor of a computing system, the replicas of the stator section having different predetermined varnish fill percentages, and processing and analyzing the images by inputting the images to the deep learning tool. The deep learning tool may be trained to crop the images to a region corresponding to slots of the replicas and to convert the images to one or more of cluster-only images and binary masks to apply a correlation between a fluorescence signature of a varnish and a quantity of the varnish. The method further includes outputting, from the deep learning tool, estimated varnish fill percentages for the images, computing, via the processor, differences between the predetermined varnish fill percentages and the estimated varnish fill percentages, and, in response to the differences being greater than a threshold difference, displaying a notification at a display device to recommend at least one of further training of the deep learning tool and adjustments to an imaging setup for acquiring the images. In this way, an accuracy of the deep learning tool may be verified using a reliable evaluation strategy.

As one example, the master verification tool used to provide calibration data for the deep learning tool may include multiple master slot replicas, each of the master slot replicas representing a different known varnish fill percentage. Upon processing and analysis of the images of the master verification tool by the deep learning tool, varnish fill percentages outputted by the deep learning tool for the images may be compared to respective known varnish fill percentages and used to evaluate the accuracy of the deep learning tool. A robustness and function (e.g., capabilities for analyzing images and generating estimated fill percentages) of the deep learning tool may thereby be increased and fill percentages for slots of the stator may be generated within a shorter time frame and with less variability than conventional methods relying on visual inspection. As a result, a user may have greater confidence in a likelihood that the deep learning tool is able to provide vanish fill percentages reflecting an actual varnish condition of the slots. Further, less labor and reliance on manual processing and inspection of the stator sections is demanded, enabling faster and more reliable quality control.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 7 shows an example of a report which may be output by a deep learning tool for displaying estimated fill percentages from images.

DETAILED DESCRIPTION

The following description relates to systems and methods for assessing a condition of an insulation system of a stator. The insulation system may include a varnish that coats the stator windings within slots of the stator. A state of the varnish may be determined by acquiring images of the stator and processing the images using a deep learning tool configured with a convolutional neural network (CNN) trained to estimate a fill percentage of the varnish at the stator slots, where the fill percentage represents how much of a surface of a selected slot is coated by the varnish. A process for estimating the fill percentage of varnish in a stator is depicted as a block diagram in FIG. 1. The stator may be configured with slots distributed along an inner surface of the stator, as shown in an example of the stator in FIGS. 2A-2B. A cross-sectional view of the stator is illustrated in FIG. 3A and a magnified view of a portion of the stator is shown in FIG. 3B.

Figure 4:
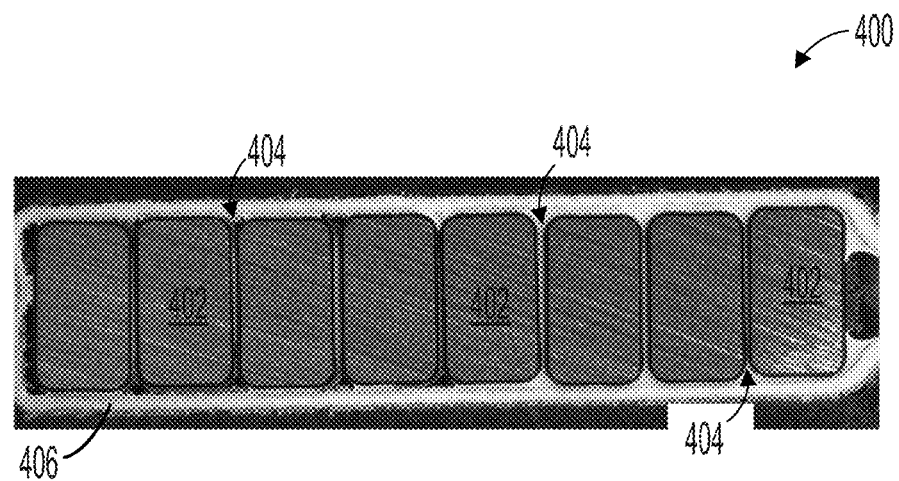
FIG. 4 shows an example of an image of windings from a transverse section of a stator.
Figure 5:
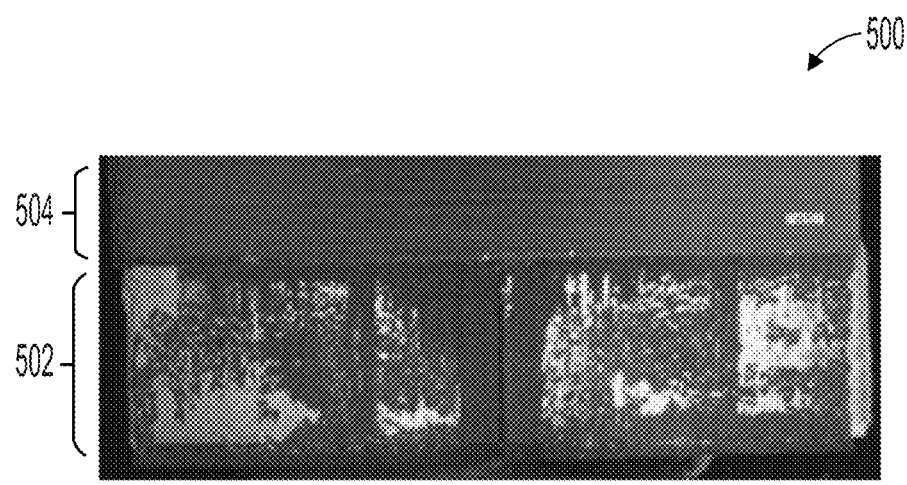
FIG. 5 shows an example of an image of an axial section of a stator.
Figure 6:
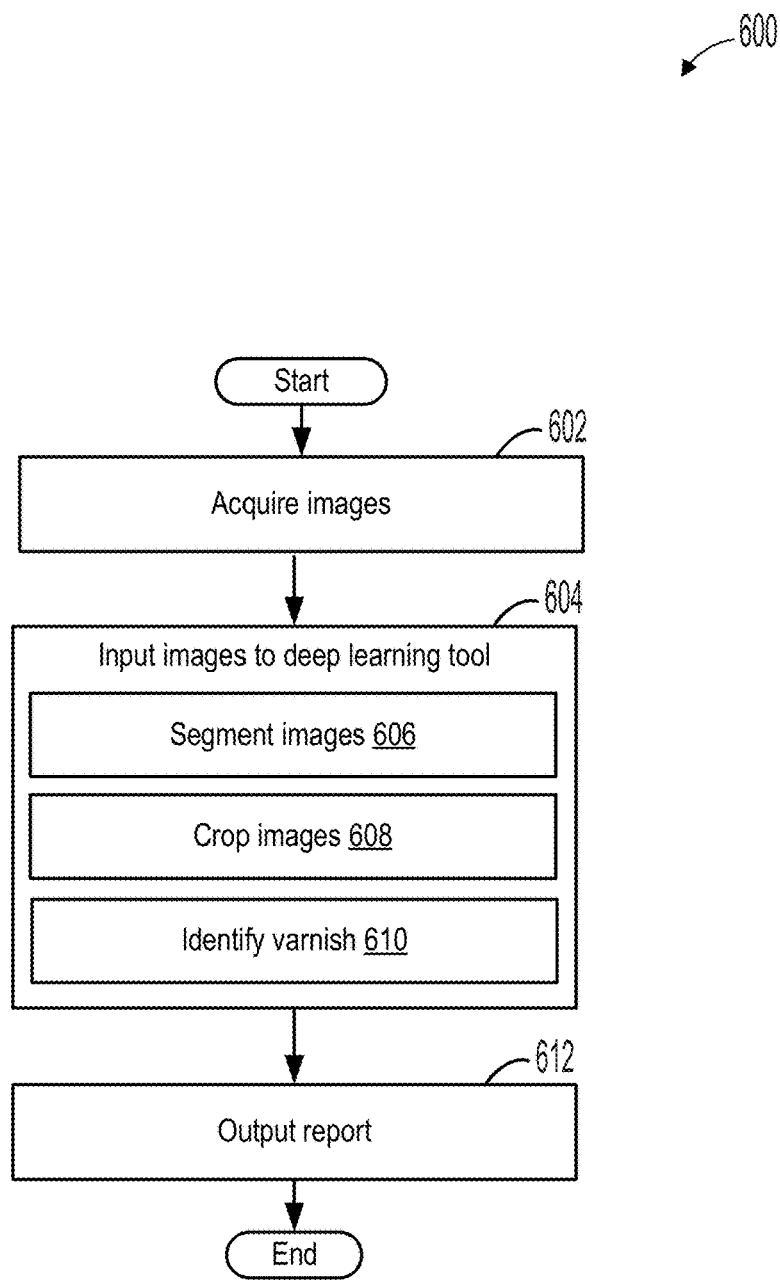
FIG. 6 shows an example of a process for analyzing varnish in stator section images using a deep learning tool implemented at a computing system.

In order to assess a condition of the varnish within the slots of the stator, the stator may be sliced to allow images of cross-sections of the stator to be acquired, the images depicting fluorescence of the varnish upon irradiation by UV light. By processing and analyzing the images using a deep learning tool, estimated varnish fill percentages for the stator may be obtained. The images of the cross-sections may be either images of transverse cross-sections of the stator, as shown in FIG. 4, where the images depict cross-sectional areas of the stator conductors, or of axial cross-sections of the stator, as shown in FIG. 5. An example of a method for automatically processing and analyzing the images for varnish via the deep learning tool is depicted in FIG. 6. The deep learning tool may output a report, such as an exemplary report shown in FIG. 7.

Figure 8:
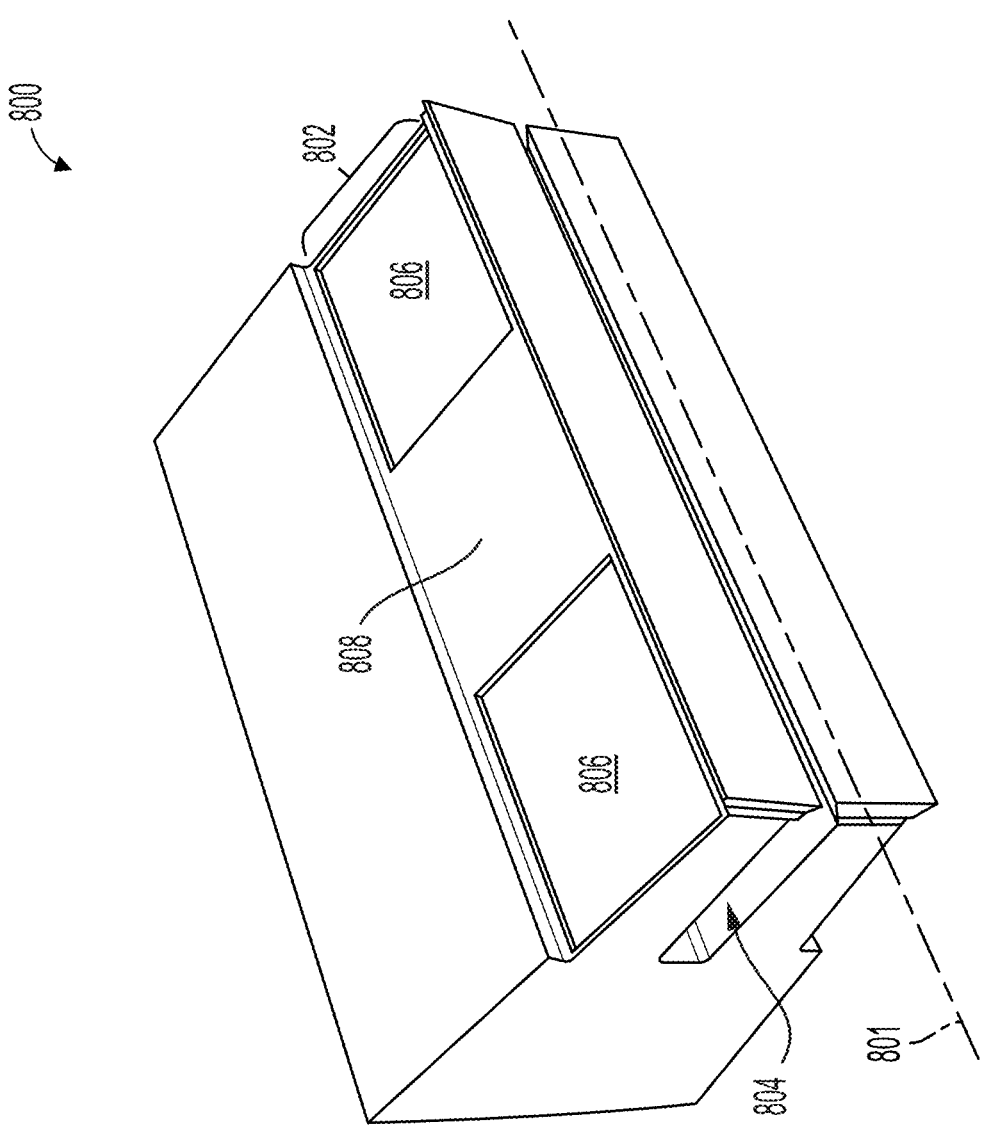
FIG. 8 shows an example of a replica of a stator section which may be included in a master verification tool for evaluating an accuracy of the deep learning tool.
Figure 8:
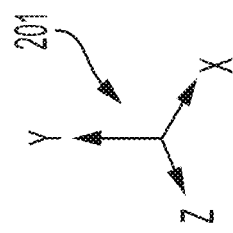
Figure 10:
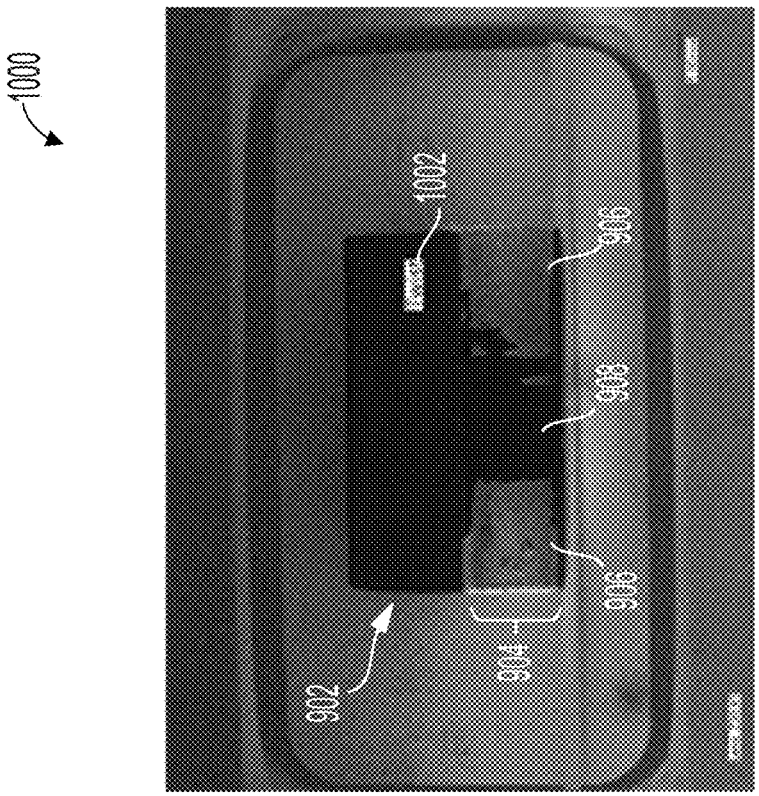
FIG. 10 shows an example of a fluorescence image of the replica of the stator section of FIG. 9.
Figure 9:
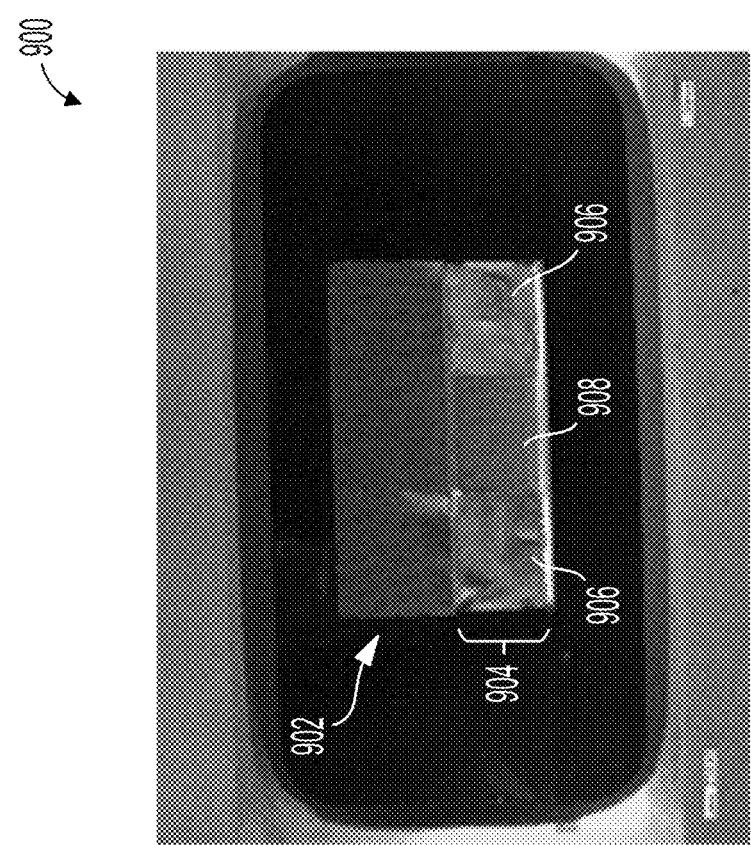
FIG. 9 shows an example of a photograph of a replica of a stator section.
Figure 11:
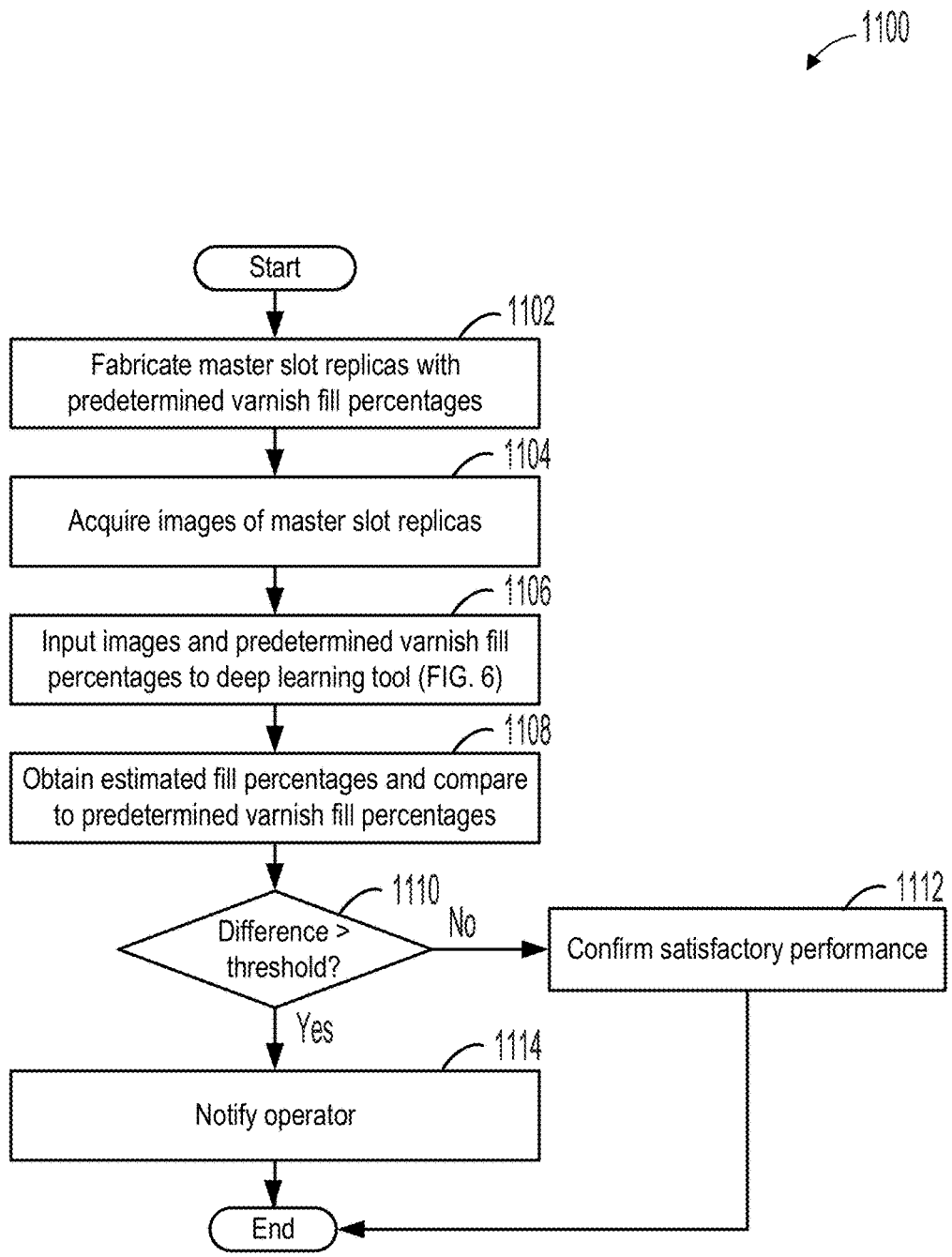
FIG. 11 shows an example of a method for verifying a performance of the deep learning tool using the master verification tool.

The output of the deep learning tool may be verified by a master verification tool, which may include one or more master slot replicas for evaluating an accuracy of the deep learning tool. An example of one of the master slot replicas is illustrated in FIG. 8 and exemplary images of the master slot replica, without and with UV irradiation, are depicted in FIGS. 9 and 10, respectively. A method for using the master verification tool to verify an accuracy of the deep learning tool is shown in FIG. 11.

Figure 1:
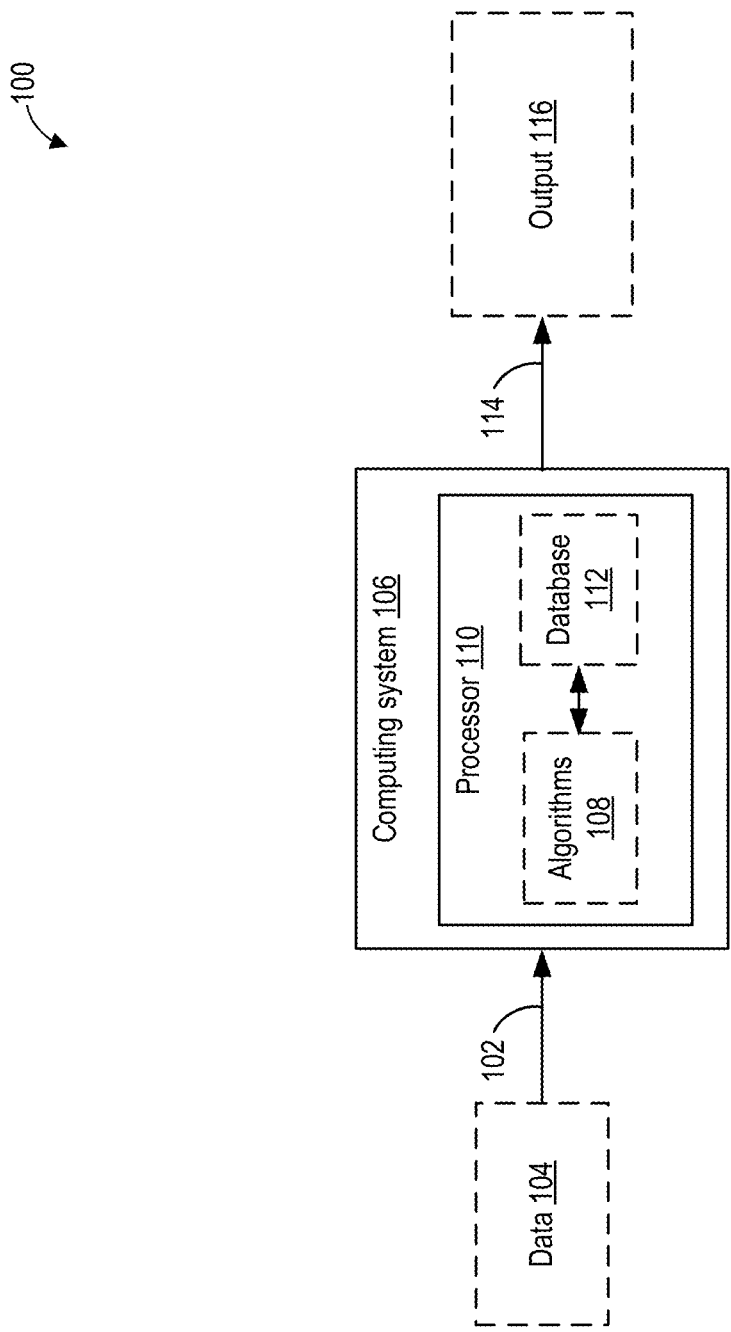
FIG. 1 shows a block diagram of a process for predicting a varnish condition of a stator.

A general process for utilizing image processing and AI algorithms for predicting a desired parameter, value, result, etc. is illustrated in FIG. 1 in a block diagram 100. Portions of the process corresponding to hardware components are depicted in solid lines while portions corresponding to data and algorithm-based components (e.g., software) are shown in dashed lines. The process may include, at step 102, inputting data 104 to a computing system 106. The data 104 may be acquired according to a format that allows the data to be recognized and manipulated by algorithms 108 implemented at a processor 110 of the computing system 106. It will be appreciated that the computing system 106 may include various other components, including hardware and software components not shown in FIG. 1 for brevity. In one example, as described further below, the data input to the computing system 106 may include images, such as visible light images (e.g., photographs) and fluorescence images.

The algorithms 108 may include a plurality of data processing algorithms stored at a memory, such as non-transitory memory, of the processor 110 and may provide instructions for manipulating, analyzing, and processing the data 104. For example, the algorithms 108 may include software for cropping images, matching images, aligning images, converting the images into different formats, etc. In addition, the algorithms 108 may include one or more AI-based models for automatically analyzing the images according to a target output 116. The AI-based models may utilize machine learning, including deep learning, to allow the AI-based models to be trained and continuously updated to generate the target output 116.

The computing system 106 may also include a database 112 storing information relevant to processing of the data 104 and at which at least some of the data 104 may be stored. In some examples, information stored at the database 112 may be used for training the AI-based models and for cross-correlation of the data 104 (e.g., newly input data) with the stored information. As such, the database 112 may initially have a quantity of training information that increases with time as more information is collected and input to the computing system 106. An accuracy of the AI-based models may therefore increase as the database grows.

As shown in FIG. 1, the algorithms 108 may provide an output that is displayed, via hardware of the computing system 106 (such as a display screen of a display device, for example) at step 114. The output 116 may be a visual representation of a prediction generated by the image processing algorithms, such as a graph, a table, an image, or combinations thereof. The output 116 may therefore include a visual display of predictions and estimates generated by the algorithms 108 that presents the output 116 in a comprehensive, concise, and/or traceable format to a user.

Figure 2A:
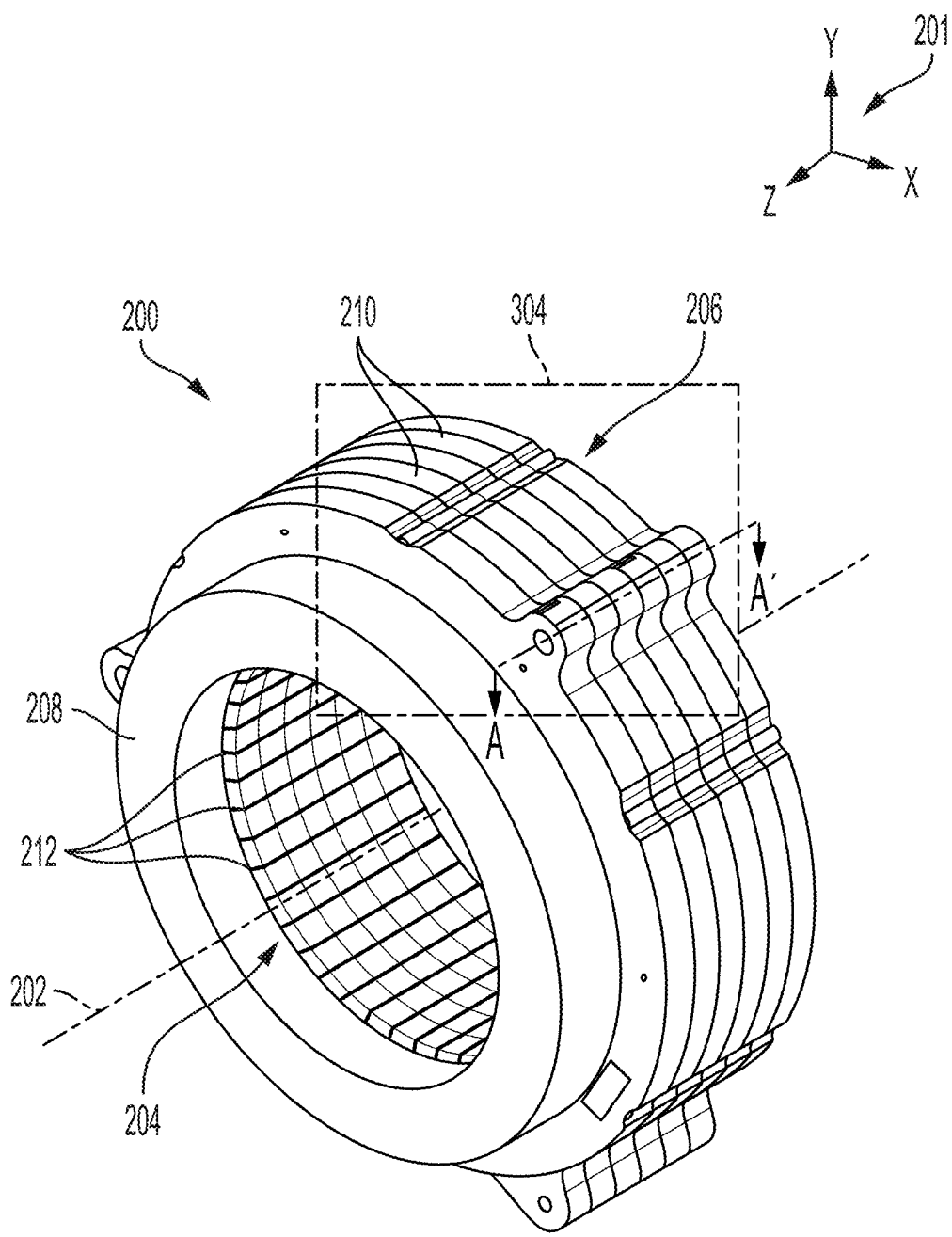
FIG. 2A shows a perspective view of an example of a stator which may include an insulation system coating windings of the stator.
Figure 2B:
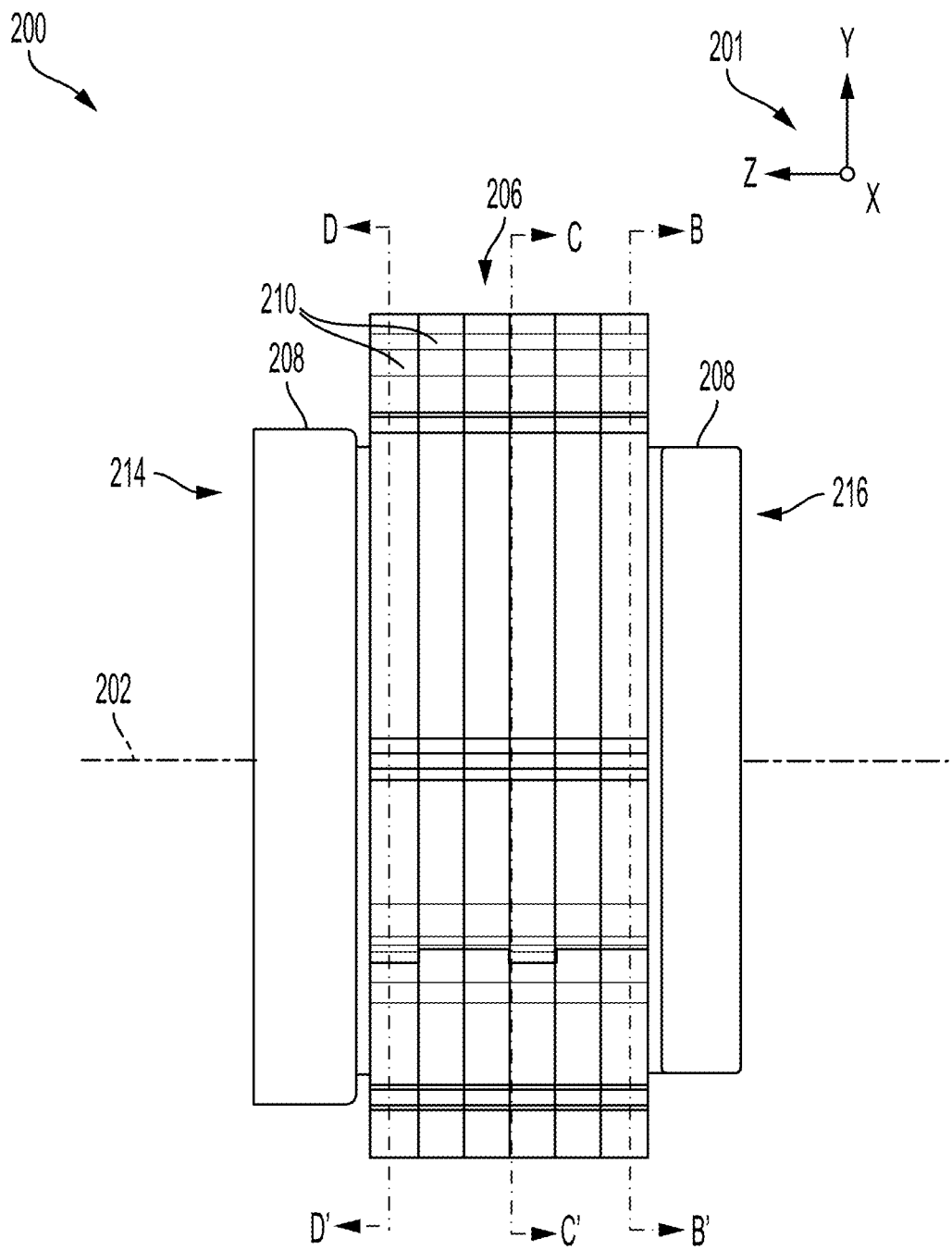
FIG. 2B shows a profile view of the stator of FIG. 2A.
Figure 3A:
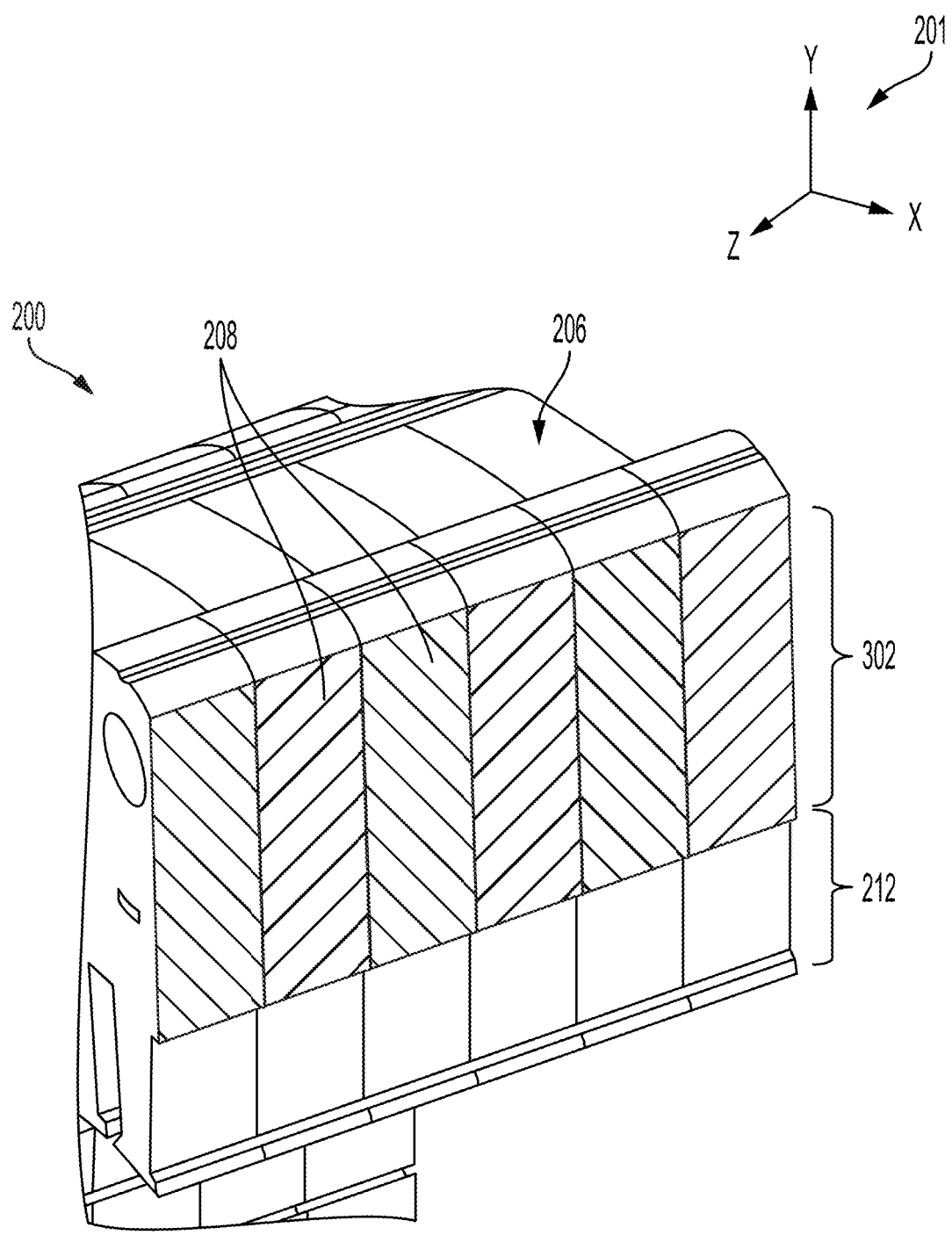
FIG. 3A shows a cross-sectional view of the stator of FIGS. 2A-2B, with windings of the stator omitted for clarity.
Figure 3B:
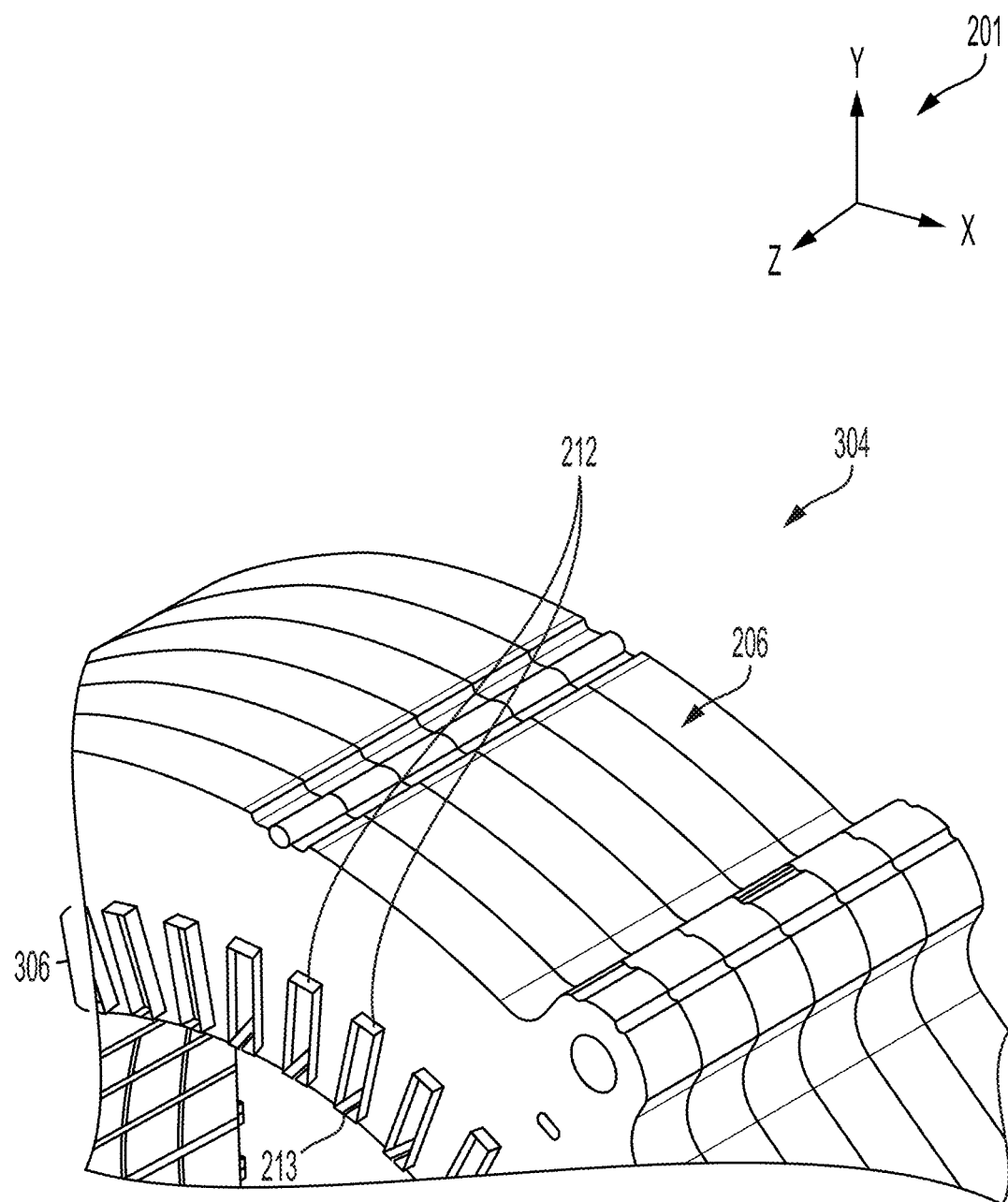
FIG. 3B shows a magnified view of a portion of the stator of FIGS. 2A-2B.

Turning now to FIGS. 2A-2B, an example of a stator 200 for an electric motor is depicted from a perspective view and a profile view, respectively. A set of references axes 201 is provided, including an x-axis, a y-axis, and a z-axis. The stator 200 has a cylindrical geometry with a central axis of rotation 202 that is aligned parallel with the z-axis, as well as an inner passage 204 extending entirely through a length of the stator 200, where the length is defined along the z-axis. When the electric motor is fully assembled, a rotor may be inserted through the inner passage 204 of the stator 200. It will be appreciated that the stator 200 shown in FIGS. 2A-2B is a non-limiting example and variations in a configuration of the stator 200, are possible without departing from the scope of the present disclosure.

The stator 200 has a core 206 formed of at least one durable, heat tolerant material. For example, the core 206 may have an exterior layer formed of stainless steel and an inner portion supporting copper conductors. For example, windings 208 may be coupled to the core 206, where the windings 208 may be formed of electrically conductive wires such as copper wires. When a potential is applied to the windings 208, current flow through the windings 208 may generate a first magnetic field in the stator 200. The first magnetic field may interact with a second magnetic field generated at a rotor positioned within the stator 200 and the interaction may cause the rotor to spin. The core 206 may be divided axially/longitudinally, e.g., along the central axis of rotation 202, into a plurality of sections 210, or laminations.

The core 206 may therefore be formed of the plurality of sections 210 stacked contiguously along the central axis of rotation 202, as shown in FIG. 3A in a cross-sectional view of the core 206, where the cross-section is taken along line A-A' of FIG. 2A. It will be noted that the windings are omitted in FIG. 3A for clarity. A cut portion 302 of the core 206 is indicated by hatching, which may be included an in outer region of the core 206 (e.g., relative to the central axis of rotation 202 of FIGS. 2A-2B), while an inner, uncut portion of the core 206 forms a side surface of one of a number of slots 212 disposed within the inner portion of the core 206.

The cutaway view of FIG. 3A shows that each of the plurality of sections 210 of the core 206 are similarly shaped and sized. The slot 212 extends into each of the plurality of sections 210 such that the slot 212 is formed along the entire length of the core 206. Returning to FIG. 2A, the slots 212 may be evenly distributed around the inner surface of the core 206. The windings 208 may be wound through the slots 212 such that the windings 208 are also distributed evenly around the core 206 and protrude from opposite ends of the core 206. For example, as illustrated in FIG. 2B, the windings 208 may extend beyond the core 206 along the central axis of rotation 202 at a first end 214 of the stator 200 and a second end 216 of the stator 200, the first end 214 opposite of the second end 216. In one example, the first end 214 may be a twist end of the windings 208 at which ends of the windings 208 are twisted together in pairs. At the second end 216, which may be a crown end of the windings 208, bends of the windings 208 may protrude from the core 206.

The slots 212 may each accommodate threading of a bundle of the windings 208 therethrough. A more detailed view of the slots 212, with the windings 208 omitted for clarity, is depicted in FIG. 3B. A portion of the stator 200 represented in FIG. 3B is indicated in FIG. 2A by dashed rectangle 304. As described above, the slots 212 are distributed evenly apart around an inner circumference of the core 206, extending from the inner surface of the core 206 into a portion of a thickness of the core 206, the thickness defined along a radial direction perpendicular to the central axis of rotation 202 (as shown in FIGS. 2A-2B). The slots 212 may be narrow in width, where the width is defined along the circumference of the core 206. As an example, the width of the slots 212 may be less than a distance between adjacent slots 212. Furthermore, the width of the slots 212 at the inner surface of the core 206, e.g., at a mouth 213 of each of the slots 212, may be narrower than a central region of the slots to retain a position of the windings 208 within the slots 212, thereby mitigating unwinding of the windings 208 through the mouth 213 of each of the slots 212. As a result of the narrowed mouths 213 of the slots 212, visual inspection of the windings 208 within the slots 212 may be obscured.

The stator may be configured with an insulation system for mitigating electrical shorting, providing a moisture barrier, and increasing a mechanical strength of the stator windings. In some examples, the insulation system may include insulating paper lining the slots of the core. The insulating paper may be positioned between the windings and surfaces of the core in the slots such that the windings do not directly contact the stator core within the slots. In other examples, however, a different material other than insulating paper may be used. Additionally or alternatively, the insulation system of the stator may include a coating applied to the windings, the coating composed of an insulating and encapsulating material, such as a varnish. The varnish may, in addition to electrical properties, have mechanical locking properties that provide mechanical support to the windings. The varnish may be added to the windings after the windings are wound through the slots of the core via methods such as dip-and-bake, trickle varnishing, vacuum pressure impregnation, etc. Gaps between surfaces of the slot and the insulating paper, and between the insulating paper and the windings, may be filled with varnish upon application. Regardless of application method, subsequent confirmation that the varnish has been applied to the windings as a uniform and continuous coating, as well as quantification of an amount of varnish in the slots, may be challenging.

For example, visual examination may not be feasible as the varnish may be a clear, colorless material and the coated windings within the stator slots may be obstructed from view. Electrical testing, such as insulation resistance tests, may confirm isolation between the stator core and phases (e.g., bundles of windings). The testing results may not indicate an amount of the varnish bonding components together, however, or, when the coating is determined to not be continuous, where a gap or voids in the coating may be located along the windings. In order to confirm that the coating is sufficiently thick and uniform to reliably withstand electric motor operating conditions over a desired period of time, thorough examination of the varnish may demand cutting a stator open to analyze the varnish within the stator slots. For example, cross-sectional areas of the stator may be illuminated with UV light to induce fluorescence of the varnish and allow capture of fluorescence images. Varnish may be identified and quantified by analysis of the fluorescence images.

Analysis of the fluorescence images may be performed via image processing software operated by a user. While the image processing software may allow detailed examination of the images, assignment of image parameters for identifying varnish and measurement of the varnish in the images is conducted by the user. A reproducibility of imaging analysis results may be low due to variability in irradiation of the cross-sectional areas, as well as in visual assessment of the images during varnish measurement, leading to poor consistency between analyses of different stator sections and between different users. Furthermore, sample preparation (e.g., slicing stators into sections), image acquisition, and processing of the images may be time-consuming and incur high costs.

The issues described above may be at least partially mitigated by implementing a deep learning tool for evaluating the varnish condition that reduces both variability in results and a duration of time to obtain the results. The deep learning tool may be trained using image analysis based on color distribution and/or machine learning to locate and quantify varnish in the images in a consistent and reproducible manner. In one example, the deep learning tool may comprise a CNN trained based on outputs from machine learning models and may further include image processing algorithms and deep learning algorithms for processing images, analyzing images based on color distribution analysis and cluster analysis to identify and quantify varnish in the images, as well as for converting analysis results into varnish fill percentages of the slots. The varnish fill percentages estimated using the deep learning tool may be presented to the user as a comprehensive visual representation, such as a table or chart reporting the fill percentage for each imaged slot. In addition, the strategy described herein enables detection of imaging differences undiscernible by the human eye, and enables data analysis and compilation at a resolution that may be unattainable within the visible spectrum of light.

In order to confirm an accuracy of the deep learning tool, a method for verifying an accuracy of the results output by the deep learning tool is demanded. The accuracy of the results may be confirmed and calibrated using a master verification tool, comprising one or more master slot replicas. The master slot replicas may be printed (e.g., 3D printed) reproductions of the stator cross-sections and may be treated with known amounts of varnish to provide a calibration dataset for the deep learning tool. Further details of the master verification tool are described below, with reference to FIGS. 8-12B.

As described above, the deep learning tool may be used to process both transverse sections and axial sections of the stator. Depending on the section type, the algorithms and techniques used to provide training data to train the deep learning tool may differ. For example, a first image 400 of the transverse section of the stator is shown in FIG. 4. The transverse section may be obtained by slicing the stator along one or more of the line B-B', the line C-C', and the line D-D' indicated in FIG. 2B, which may provide transverse section images at a crown end, a central region, and a twist end of the stator, respectively. The first image 500 does not include a core of the stator and instead shows a plurality of conductors 402 of the stator. The plurality of conductors 402 may be aligned along a linear axis in the transverse images for more efficient processing.

Within a slot of the stator, the plurality of conductors 402 may be arranged aligned with one another along a radial direction relative to a central axis of rotation of a stator (e.g., perpendicular to and radiate outwards from the central axis of rotation). Each of the plurality of conductors 402 is a copper wire and may be spaced away from adjacent conductors by gaps 404. In other words, each of the gaps 404 is located between two of the plurality of conductors 402. The gaps 404 may be spaces between the plurality of conductors into which varnish may be deposited upon application to the stator. Further, the gaps 404 may extend along a portion of a thickness of the stator within an inner portion of the stator core. As an example, the inner portion is indicated by bracket 306 in FIG. 3B.

Insulating paper 406 surrounds the plurality of conductors 402, forming a continuous border around the plurality of conductors 402. As described above, the insulating paper may be arranged between outer surfaces of the plurality of conductors 402 and surfaces of the slot in which the plurality of conductors 402 are located. The outer surfaces of the plurality of conductors 402 may be surfaces that are perpendicular to surfaces bordering the gaps 404. Varnish may be present both in the gaps 404 between the plurality of conductors 402 and in spaces between outer surfaces of the plurality of conductors 402 and the insulating paper 406. The first image 400 may also depict voids in the varnish, shown as dark regions around the plurality of conductors 402 in FIG. 4. Identification and analysis of varnish around the plurality of conductors 402, e.g., by the deep learning tool, may therefore allow a relative amount of varnish coating the plurality of conductors to be estimated.

A second image 500 of a stator section is shown in FIG. 5, where the stator section is an axial section. For example, the axial section may be obtained by slicing a stator along a central axis of rotation of the stator, through a slot 502 of the stator. The stator section of FIG. 5 may be analogous to the cross-sectional view of the stator 200 of FIG. 3A with the slot 502 of FIG. 5 being similar to the slot 212 of FIG. 3A. The slot 502 therefore extends along a length of the stator with a cut portion 504 of the stator depicted above the slot 502. It will be noted that the second image 500 does not show an entire area of the cut portion 504 and insulating paper is removed from the slot 502. Varnish identified along a surface of the slot 502, e.g., by the deep learning tool, may therefore represent varnish filling gaps between the surface of the slot 502 and the insulating paper. The varnish identified in images of axial sections of the stator may be analyzed to estimate fill percentages of the stator slots.

An example of a method 600 for evaluating a varnish condition of a stator is shown in FIG. 6. Method 600, and the rest of the methods described herein, may be executed by a processor of a computing system, such as the processor 110 of FIG. 1. As shown in FIG. 1, the processor may be configured with image processing algorithms which may include both non-AI and AI algorithms. The stator may be a stator with a slotted inner surface, as shown in FIGS. 2A-3B, with windings wound through slots of the stator and the slots lined with insulating paper. Sections of the stator may be analyzed via method 600, the sections being either transverse sections, as shown in FIG. 4, or axial sections, as shown in FIG. 5. When cut transversely, the transverse images used for processing may be images of individual windings (e.g., wire conductors) of the stator rather than the stator core. When cut axially, the stator may be sliced through at least one of the slots, allowing side surfaces of the slot to be imaged. In other words, the transverse images show cross-sectional areas of the windings while the axial images show cross-sectional areas of the stator core, at the slots.

At 602, method 600 includes acquiring images of the stator sections at the slots. The images may include at least fluorescence images, obtained by irradiating the stator with UV light from a UV light source. A wavelength of UV light emitted from the UV light source may be selected based upon a predetermined target wavelength or wavelength range that induces fluorescence at the varnish. Absorption of UV light by the varnish may cause atomic excitation, followed by emission of light from the varnish, e.g., photoluminescence, at longer wavelengths than the incident light. As an example, the wavelength of the UV light may be between 350 nm and 450 nm while a wavelength of light emitted via fluorescence by the varnish may be between 400 nm and 475 nm.

In order to obtain reproducible analysis of the images, the images may be collected using consistent image acquisition settings via at least one fluorescence detector. In other words, any images obtained via the fluorescence detector may be acquired using pre-set, uniform image acquisition settings. For example, a pre-set incidence wavelength, detection wavelength, focus, focal depth, lighting, incident wavelength angle, detector positioning, stator section orientation, etc., may be used for all imaging events for each stator section. In addition, in some examples, the stator section may be enclosed within a housing during imaging, with the housing configured to support and accommodate positioning of the UV light source therein. By enclosing the stator section and UV light source within the housing during image acquisition, adverse image effects from external lighting and contamination by debris may be circumvented.

At 604, method 600 includes feeding the acquired images to a deep learning tool. For example, the images may be temporarily stored in transient memory of the computing system and delivered to the processor for analysis by the image processing algorithms of the deep learning tool. Alternatively, the images may be stored at a database of the computing system and may be retrieved by user request to be transmitted to the image processing algorithms. The deep learning tool may be trained to locate and quantify varnish based on training datasets generated using image processing and machine learning algorithms. The training datasets may include images processed and analyzed via k-means clustering and color distribution analysis, for example. However, other techniques for training the deep learning tool are possible.

By inputting the images to the deep learning tool at 604, the images may be segmented at 606 of method 600. For example, the deep learning tool may be trained to identify regions of the images corresponding to slots. In other words, the deep learning tool may locate one or more slots in the images. In one example, the training of the deep learning tool to identify the slots may include comparing photographs of the slots to correlated fluorescence images and dividing the images into segments based on the comparison. Furthermore, the images may be segmented according to other identified regions of interest (ROIs). The other ROIs may include other areas of the stator at which varnish may be deposited.

Inputting the images to the deep learning tool may also allow the images to be cropped at 608 of method 600. For example, when the images are of transverse sections, as shown in FIG. 4, the images may be cropped to edges of insulating paper surrounding each of the conductors in the images. Similarly, when the images are of axial sections, the images may be cropped to edges of the slot depicted in the images, thereby removing other regions of the stator core shown in the images. In other words, an image may be cropped by identifying borders of a slot depicted in the image and trimming the image to remove regions outside of the borders (e.g., regions not corresponding to the slot). The deep learning tool may be trained to identify the slots in the images, according to the type of stator section, and crop the images accordingly.

Inputting the images to the deep learning tool may further enable varnish to be identified in the images at 610 of method 600. As an example, the deep learning tool may include algorithms for extracting color signatures of varnish from the images to allow quantification of the varnish, relative to a cross-sectional area of the slot, and estimate varnish fill percentage for each slot of the images. For example, a CNN included in the deep learning tool may be trained, as described above, to identify varnish based on a fluorescence signature of the varnish, allowing the deep learning tool to locate regions of varnish that may not be visually discernible to a user. In one example, the images may be converted to one or more of cluster-only images and binary masks to enable analysis of a fluorescence of the varnish to be correlated to a quantity of the varnish.

At 612, method 600 includes outputting a report with the estimated fill percentages. For example, the deep learning tool may convert results of analysis of the images for varnish, as described above with respect to 610 into numerical quantifications of the varnish. The report may be presented as a table, spreadsheet, etc., and may be displayed at a display device. An example of a report 700 that may be output from the deep learning tool is illustrated in FIG. 7. In addition to the fill percentages for the slots, the report 700 may further include information such as a slot number, surface area and varnish area of each slot, and fill percentages according to a portion of a slot, e.g., a twist end, a central region, or a crown end of the slot. The portion of the slot may be determined based on reference to an image label, as shown in FIG. 10. For images of transverse sections of the stator, identification of the portion of the slot may depend on a relative positioning of a transverse section along a length of the stator. For example, a twist, a central, and a crown portion of the stator is indicated by lines D-D', C-C', and A-A', respectively, in FIG. 2B, which may have individual fill percentages in the report 700. The surface area and varnish area of each slot may also be displayed in the report. Furthermore, the report may be generated in a file format that allows the report to be readily viewed, exported, and/or edited using various types of software.

While capabilities of the deep learning tool may be continuously enhanced by increasing a pool of training data input to the deep learning tool, at least an initial verification of an accuracy of the deep learning tool may be desirable. Use of visually analyzed stator sections, e.g., based on visual inspection by a user, to calibrate the accuracy of the deep learning tool may be unreliable, however, owing to introduction of human error into resulting user-estimated varnish fill percentages. A more robust strategy for verifying an output of the deep learning tool is therefore demanded.

In one example, verification and calibration of the accuracy of the deep learning tool may be provided by a master verification tool. The master verification tool may include one or more master slot replicas, which may be replicas of stator sections with predetermined quantities of varnish, the predetermined quantities of varnish also included in the master verification tool. Thus, the master verification tool may be a combination of physical reproductions of stator sections and corresponding data regarding varnish fill percentage for the reproduced stator sections.

An example of a master slot replica 800 is illustrated in FIG. 8. The master slot replica 800 may represent an axial cross-section of a stator, such as that shown in FIG. 5, and may be fabricated by, for example, 3D printing, although other methods of fabrication are possible. Further, while a master slot replica representative of an axial cross-section is shown and described with respect to FIGS. 8-101, a master slot replica representing a transverse cross-section may be used analogously. Similar to a stator core, the master slot replica 800 may be formed of stainless steel, for example, and may include a slot portion 802 analogous to a surface of a slot, which may also form a portion of a surface of the master slot replica 800. An additional slot 804 is also included in the master slot replica 800, and a hypothetical central axis of rotation 801 is indicated in FIG. 8, which may be aligned parallel with the z-axis.

The slot portion 802 of the master slot replica 800 may include two shallow pockets 806, arranged on other side of a central section 808 of the slot portion 802. In other examples, however, the slot portion 802 may have other quantities of the shallow pockets 806, such as one, three, or four of the shallow pockets 806. The shallow pockets 806 may be rectangular, recessed regions, relative to the central section 808, forming compartments into which varnish may be deposited. However, in other examples, the shallow pockets 806 may have other geometries and/or may not be spaced apart from one another by the central section 808. The varnish may be deposited into the shallow pockets, 806, e.g., using a dropper, pipette, etc., to apply a known amount of varnish into one or more of the shallow pockets 806. The known amount of varnish may correspond to a target fill percentage. The varnish may be distributed equally between the shallow pockets 806, or may be distributed unevenly between the shallow pockets 806.

The master verification tool may include more than one master slot replicas, e.g., a collection of master slot replicas. Each of the master slot replicas may be configured with a different known amount of varnish, and therefore the master slot replicas may each correspond to a different varnish fill percentage. For example, the collection of master slot replicas may correspond to varnish fill percentages of 0%, 25%, 33%, 50%, 66%, and 100%. Analysis of the collection of master slot replicas by a deep learning tool, e.g., the deep learning tool described with respect to FIG. 6, may provide results which may be used as a calibration curve for verifying an accuracy of the deep learning tool. In some examples, the master verification tool may be also used as a training tool, in addition to training of the deep learning tool based on training datasets generated by image processing and machine learning algorithms, to increase the accuracy of the deep learning tool.

Verification of the deep learning tool performance may include acquiring images of the collection of master slot replicas, as described with respect to 602 of FIG. 6. For example, each of the master slot replicas may be positioned within a housing and irradiated with UV light under uniform image collection settings. Fluorescence images (as well as photographs) of the master slot replicas may be obtained and fed to the deep learning tool for processing and analysis, as described in method 600 of FIG. 6.

As an example, a photograph 900 of a master slot replica 902 and fluorescence image 1000 of the master slot replica 902 are depicted in FIGS. 9 and 10, respectively. The master slot replica 902 may be similar to the master slot replica 800 of FIG. 8. For example, a surface of the master slot replica shown in FIGS. 9 and 10 also includes a slot portion 904. The slot portion 904 has shallow pockets 906 on either side of a central section 908, with varnish disposed in the shallow pockets 906. In one example, one of the shallow pockets 906 may correspond to a crown end of a slot and the other of the shallow pockets 906 may correspond to a twist end of a slot. The varnish in the shallow pockets 906 may be applied according to a predetermined fill percentage.

The master slot replica 902 may be formed of a non-fluorescing material, such as stainless steel. Upon irradiation with UV light, as shown in FIG. 10, the varnish in the shallow pockets may fluoresce, allowing the varnish to be visually distinguishable from non-varnish coated regions based on color. In particular, subtle variations in a color of the varnish, may not discernible by human eyes but may be identified by the trained deep learning tool using methodologies, as described above, such as cluster analysis and color distribution analysis.

In addition, upon inputting a fluorescence image, e.g., the fluorescence image 1000 of FIG. 10, to the deep learning tool, one or more of a crown end and a twist end of a slot portion of the fluorescence image may be labelled and identified. For example, as shown in FIG. 10, the slot portion 904 of the master slot replica 902 in the fluorescence image 1000 may include a label 1002 indicating an end of the slot portion corresponding to a twist end of a stator. The predetermined fill percentage for the slot portion may further include specific predetermined fill percentages for each of the shallow pockets 906. By labelling the fluorescence image, estimated fill percentages specific to the twist end or the crown end of the slot may be determined and compared to the specific predetermined fill percentages of each of the shallow pockets 906. As a result, the accuracy of the deep learning tool may be evaluated at a higher resolution, allowing further training of the deep learning tool to be directed to specific areas of reduced accuracy.

An accuracy of estimates provided by the deep learning tool may be evaluated by feeding images of the master slot replicas, obtaining estimated fill percentages for the master slot replicas, and comparing the estimated fill percentages to known fill percentages of the master slot replicas. The master verification tool may thereby be included in a quality control strategy for stator manufacturing, used to at least initially determine the accuracy of the deep learning tool. If the results output by the deep learning tool deviate from the known fill percentages by more than a threshold, further training of the deep learning tool may be indicated, as an example. As such, the master verification may be used periodically to verify the performance of the deep learning to ensure that an estimation accuracy of the deep learning tool does not degrade over time.

An example of a method 1100 for verifying an accuracy of the deep learning tool is shown in FIG. 11. Method 1100 may be executed by a processor of a computing system, such as the processor 110 of FIG. 1, which may be configured with 3D printing algorithms for printing master stator replicas, image acquisition algorithms for controlling an imaging system and collecting images therefrom, as well as image processing and machine learning algorithms for processing and analysis of images. While method 1100 is described herein as being executed by one processor for all steps included in method 1100, it will be appreciated that, in other examples, separate processors may be used for different types of processing. For example, 3D printing of the master stator replicas may be achieved using a first processor, image acquisition may be accomplished using a second processor, and the deep learning tool may be implemented at a third processor. Alternatively, the 3D printing may be instructed by the first processor and both image acquisition and application of the deep learning tool to acquired images may be conducted using the second processor, or 3D printing algorithms and image acquisition algorithms may be implemented at the first processor while the deep learning tool may be implemented at the second processor, etc.

At 1102, method 1100 includes fabricating the master slot replicas and applying varnish to the master slot replicas according to predetermined varnish fill percentages. For example, the master slot replicas may be 3D printed from non-fluorescing materials, such as stainless steel, according to the 3D printing algorithms. Quantities of varnish corresponding to the predetermined fill percentages may be applied to each of the master slot replicas. As an example, the varnish may be deposited in shallow pockets of the master slot replicas, such as the shallow pockets 806 of FIG. 8 and 906 of FIGS. 9 and 10, using droppers or some other dispensing device. The varnish may be applied to each of the shallow pockets of one of the master slot replicas in equal or unequal amounts. The master slot replicas may be fabricated to be indistinguishable from actual stator sections.

At 1104, method 1100 includes acquiring images of the master slot replicas. The images may include at least fluorescence images, as shown in FIG. 10, obtained by irradiating the master slot replicas within a housing, for example, using uniform image acquisition settings, as described at 602 of FIG. 6. The images may be acquired by digital imaging equipment including a microscope in combination with an optical instrument, e.g., a digital detector such as a camera. In some examples, the images may also include photographs, as shown in FIG. 9. The images may be input to the deep learning tool at 1106, which may include feeding digital files of the images to the deep learning tool. In one example, the images may be input to the deep learning tool specifically as verification images. The predetermined varnish fill percentages may therefore also be delivered to the deep learning tool and each of the predetermined varnish fill percentages may be matched with a corresponding image. In some examples, each of the predetermined varnish fill percentages may represent an overall fill percentage of the corresponding image and may be further divided into specific fill percentages corresponding to each of the shallow pockets. The specific fill percentages may also be input to the deep learning tool, along the overall fill percentages. Upon receiving the images and the predetermined fill percentages, the deep learning tool may process and analyze the images as described at 604 of FIG. 6.

At 1108, method 1100 includes obtaining estimated fill percentages from the deep learning tool and comparing the estimated fill percentages to the predetermined fill percentages of the master slot replicas. For example, the deep learning tool may be configured to determine an estimated fill percentage for each of the images and refer to the corresponding predetermined fill percentage. A difference between the estimated fill percentage and the predetermined fill percentage may be calculated for each of the images.

At 1110, method 1100 includes determining if the differences between the estimated fill percentages output by the deep learning tool and the predetermined fill percentages are greater than a threshold difference. For example, individual differences between the estimated fill percentages and the corresponding predetermined fill percentages may be averaged and compared to the threshold difference. In another example, the individual differences may not be averaged but instead scanned to identify if one or more of the differences exceeds the threshold difference. The threshold difference may be, for example, a difference of 1% or less, 3% or less, 5% or less, or 10% or less. However, other values of the threshold differences are possible.

If the averaged difference or if at least one of the individual differences between the estimated fill percentage and the predetermined fill percentages does not exceed the threshold difference, method 1100 continues to 1112 to confirm that the accuracy the deep learning tool is satisfactory. For example, a notification may be displayed at a display screen of a display device indicating a relative accuracy of the deep learning tool and a visual confirmation that no further training of the deep learning tool is demanded.

If the averaged difference or if at least one of the individual differences is greater than the threshold difference, method proceeds to 1114 to provide a visual notification. The notification may indicate a deviation of the deep learning tool performance from a desired accuracy of prediction, which may be displayed as a percent accuracy of the estimations provided by the deep learning tool, for example. Remedial actions may be recommended in the notification, such as additional training of the deep learning tool and/or adjusting of a lighting/imaging setup. For example, a camera position or a position of UV light source may be inadvertently varied during manipulation of the master slot replicas. The deep learning tool may be trained to assess images to determine whether changes to imaging parameters, indicating variations in relative positioning of imaging equipment and/or settings, are apparent from the images. The notification may provide instructions as to how reposition the equipment or reset parameters accordingly. In some examples, the recommendations provided in the notification may include suggestions for targeted training of the deep learning tool. For example, the results may indicate that the deep learning tool provides more accurate estimates at a first range of fill percentages and less accurate estimates at a second range. The training may therefore be selectively focused on the second range. As another example, comparison of the predetermined fill percentages to the estimated fill percentages may reveal a bias for higher accuracy at a crown end of slot portions of the master slot replicas. The training recommendations may therefore be directed to a twist end of the slot portions.

In this way, a condition of a varnish coating windings of a stator may be evaluated in an efficient and reliable manner. By tuning UV irradiation of stator cross-sections to wavelengths of light that induce fluorescence from the varnish, fluorescence images of the stator may be obtained. Regions corresponding to the varnish may be readily located and quantified in the images by a deep learning tool trained to analyze fluorescence images for varnish. An accuracy of the deep learning tool may be maintained high by using a master verification tool to assess a performance of the deep learning tool. The master verification tool may include one or more fabricated reproductions of stator sections, e.g., master slot replicas, each reproduction having a known amount of varnish applied to a surface of a slot portion of the reproduction, and therefore having a known fill percentage of varnish. The master verification tool may further include data regarding the known fill percentages which may be correlated to images of the reproductions and the images, along with the data, may be input to the deep learning tool. Resulting estimated fill percentages output by the deep learning tool may be compared to the known fill percentages to assess the accuracy of the deep learning tool. Quality control of manufactured stators with respect to varnish condition within the stator slots may be maintained high as a result.

A technical effect of using the master verification tool to evaluate the accuracy of the deep learning tool is that the performance of the deep learning tool may be determined rapidly and with a tunable level of resolution. For example, by incorporating more master slot replicas in the master verification tool, each representing a different fill percentage, a more detailed assessment of the deep learning tool performance may be obtained. As an example, accuracy of the deep learning tool may be skewed lower as the fill percentage decreases (e.g., the accuracy of the deep learning tool is not equal across all fill percentages). By evaluating the deep learning tool via the master verification tool, bias in accuracy may be detected and corrected by implementing additional training of the deep learning that targets low fill percentages. As such, selective training of the deep learning tool to address specific areas of low accuracy may be enabled. As a result of accuracy verification using the master verification tool, training of the deep learning tool to optimize the performance of the deep learning tool may be more efficient.

FIGS. 2A-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2A-3B are shown approximately to scale.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for evaluating a deep learning tool for estimating varnish fill percentages of a stator, comprising:
    a housing enclosing a UV light source and digital imaging equipment;
    one or more replicas of a section of the stator having varnish configured to fluoresce when irradiated by the UV light source, the one or more replicas having amounts of varnish corresponding to predetermined varnish fill percentages; and
    a processor configured with the deep learning tool and instructions stored on non-transitory memory that, when executed, cause the processor to:
        receive images of the one or more replicas from the digital imaging equipment;
        process and analyze the images using the deep learning tool by cropping the images and analyzing a fluorescence signature of the images, the deep learning tool trained to identify and quantify the varnish using deep learning algorithms;
        output estimated varnish fill percentages from the deep learning tool;
        compare the estimated varnish fill percentages to the predetermined varnish fill percentages; and
        display a notification to a user at a display device in response to a difference between the estimated varnish fill percentages and the predetermined varnish fill percentages being greater than a threshold difference.

2. The system of claim 1, wherein the section of the stator includes a transverse cross-section of the stator, the transverse cross-section obtained by slicing the stator along a plane perpendicular to a central axis of rotation of the stator.

3. The system of claim 1, wherein the section of the stator includes an axial cross-section of the stator, the axial cross-section obtained by slicing the stator along a plane parallel with a central axis of rotation of the stator through at least one slot of the stator.

4. The system of claim 1, wherein the difference is an averaged difference between each of the estimated varnish fill percentages and a corresponding predetermined varnish fill percentage of the predetermined varnish fill percentages.

5. The system of claim 1, wherein the notification is displayed when at least one difference between one of the estimated varnish fill percentages and a corresponding predetermined varnish fill percentage of the predetermined varnish fill percentages is greater than the threshold difference.

6. The system of claim 1, wherein the one or more replicas are fabricated reproductions of the section of the stator, and wherein the one or more replicas are fabricated with shallow pockets in a slot portion of each of the one or more replicas.

7. The system of claim 6, wherein the varnish is disposed in the shallow pockets of each of the one or more replicas according to one of the predetermined varnish fill percentages, and wherein the varnish is disposed in equal or unequal amounts amongst the shallow pockets for a respective replica of the one or more replicas.

* * * * *